June 25, 1957 E. WITTCOFF 2,796,680
NOVELTY EDUCATIONAL HATS
Filed June 25, 1956
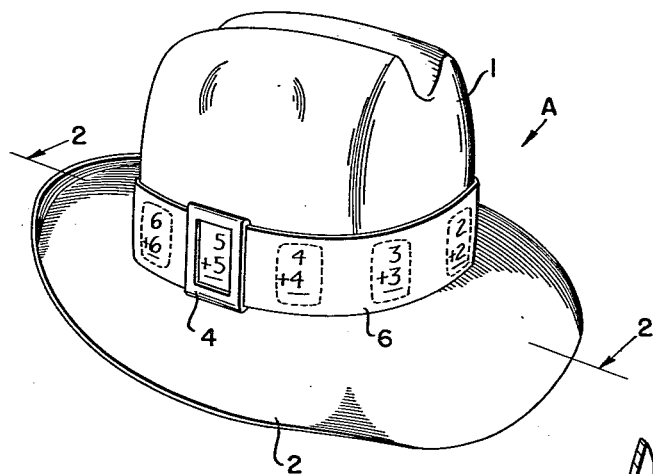
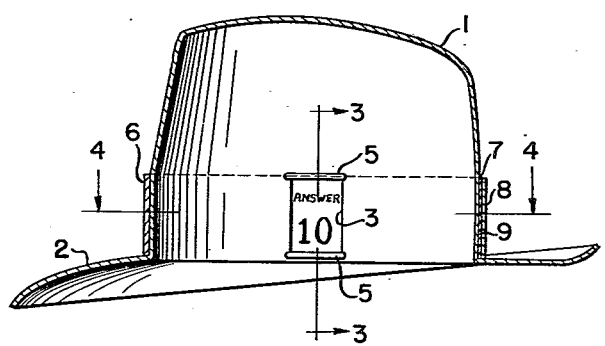
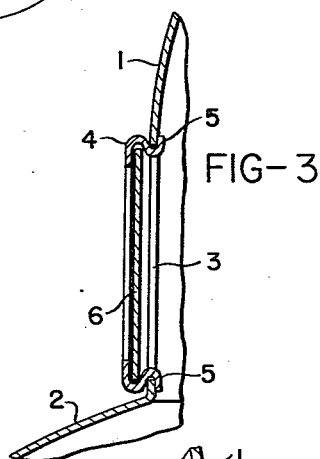
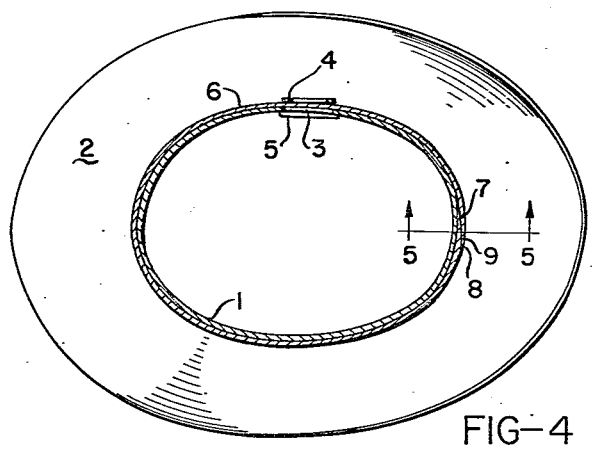
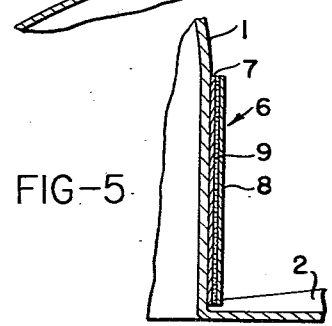
INVENTOR:
EDWARD WITTCOFF
BY *Alfred W. Petchaft*
ATTORNEY United States Patent Office 2,796,680
Patented June 25, 1957

2,796,680

NOVELTY EDUCATIONAL HATS

Edward Wittcoff, University City, Mo.

Application June 25, 1956, Serial No. 593,521

7 Claims. (Cl. 35—9)

This invention relates in general to children's novelty hats and, more particularly, to a hat which can be employed both as a head covering and as an educational or game-playing device.

It is a well known pedagogic principle that children will learn more rapidly if educative processes are repetitive in character and are made to assume the form of a game. This is particulraly true of learning routine matters which must be committed to memory, such as addition, subtraction, multiplication, history dates, identification of historical personages, and the like. It is also true that children are attracted by, and enjoy playing with, various types of hats, such as firemen's helmets, space-pilots' headgear, and cowboy hats.

Accordingly, it is a primary object of the present invention to provide a child's hat which is capable of educational and game-playing use.

It is also an object of the present invention to provide a hat adapted for various types of educational drills and games in which a series of problems or questions are imprinted in any suitable manner along the outside face of the hatband and the correct answers can be ascertained from the inside face of the hatband through an aperture or window in the crown.

It is an additional object of the present invention to provide a hat of the type stated in which the imprinted hatband can be easily shifted into various positions around the crown.

It is a further object of the present invention to provide a hat of the type stated having a hatband which is readily removable and replaceable at will.

With the above and other objects in view, my invention resides in the novel features of form, construction, arrangement, and combination of parts presently described and pointed out in the claims.

In the accompanying drawing—

Fig. 1 is a perspective view of a child's hat constructed in accordance with and embodying the present invention;

Fig. 2 is a longitudinal sectional view taken along line 2—2 of Fig. 1;

Fig. 3 is a fragmentary sectional view taken along line 3—3 of Fig. 2;

Fig. 4 is a horizontal sectional view taken along line 4—4 of Fig. 2; and

Fig. 5 is a fragmentary sectional view taken along line 5—5 of Fig. 4.

Referring now in more detail and by reference characters to the drawing, which illustrates a preferred embodiment of the present invention, A designates a hat integrally including a crown 1 and brim 2 formed of any usual hat-body material, such as felt, straw, or pressed fibre. The crown 1 is provided, in one side wall, with an aperture or window 3 across which is mounted a frame 4 formed of sheet metal, synthetic resin, or other suitable material, and having reversely bent marginal flanges 5 which are crimped retentively around opposite margins of the window 3, thereby holding the frame 4 in outwardly spaced parallel relation to the outer side face of the crown 1, as shown in Fig. 3.

Threaded slidably through the space between the frame 4 and the side face of the crown 1 is a hatband 6 having its ends shived as at 7, 8, and secured together in crown-encircling position at such extremities by a film of pressure-sensitive adhesive 9. The outer face of the hatband 6 is imprinted, in suitably spaced areas, with a series of simple arithmetic problems, for example, and the answers to the problems are similarly imprinted on the reverse side thereof, each problem and its answer being preferably arranged in back-to-back relation. Thus, when a particular problem is visible through the frame 4, the corresponding answer can be seen by looking into the inside of the crown and viewing it through the window 3, as shown in Fig. 2. The hatband 6 can, of course, be shifted around the crown 1 to bring various different problems into view through the frame 4, and, in each instance, the proper answer will come into view within the window 3. Consequently, the wearer can ask his playmate to answer the particular question or problem displayed through the frame 4 and remove his hat to prove the answer in case of dispute or lapse of memory. It will, of course, be understood that other things than the arithmetical problems shown in the drawings may be employed. For instance, pictures of various Presidents of the United States or other historical personages may be imprinted on the hatband and the corresponding names or the dates of their tenures of office imprinted on the reverse side. For play-appeal, a series of famous baseball players could be imprinted on the hatband with their respective batting averages for the last few years imprinted on the reverse side. Similarly, the hat A could be used as an advertising premium in connection with a television quiz program by imprinting upon the hatband questions used on the quiz program and imprinting the corresponding answers on the reverse side.

It should be understood that changes and modifications in the form, construction, arrangement, and combination of the several parts of the novelty hat may be made and substituted for those herein shown and described without departing from the nature and principle of my invention.

Having thus described my invention, what I claim and desire to secure by Letters Patent is:

1. A novelty hat comprising a crown, a brim adjoined to and extending annularly around the crown, said crown being provided with an aperture, a hatband mounted around the crown, said hatband being provided on its outwardly presented face with a series of spaced areas, each of which is provided with legible information, said hatband also being provided on its interior face with a plurality of spaced areas, each of which is imprinted with legible information, the information printed on each area of the external face of the hatband being uniquely related to the information printed in a corresponding area on the interior face of the hatband, said hatband furthermore being operatively associated with the aperture of the crown so that at any one time a particular information-containing area on the interior surface of the hatband will be visible from the inside of the crown, and means operatively associated with the crown and the exterior surface of the hatband for indicating the particular information-containing area on such exterior surface related to the corresponding information-containing area which is visible from the inside of the crown.

2. A novelty hat comprising a crown, a brim adjoined to and extending annularly around the crown, said crown being provided with an aperture adjacent to the brim, a hatband slidably mounted around the crown, said hatband being provided on its outwardly presented face with a series of spaced areas, each of which is provided with legible information, said hatband also being provided on its interior face with a plurality of spaced areas, each of which is imprinted with legible information, the information printed on each area of the external face of the hatband being uniquely related to the information printed in a corresponding area on the interior face of the hatband, said hatband furthermore being operatively associated with the aperture of the crown so that at any one time a particular information-containing area on the interior surface of the hatband will be visible from the inside of the crown, and means operatively associated with the crown and the exterior surface of the hatband for indicating the particular information-containing area on the exterior surface of the hatband which is related to the corresponding information-containing area on the interior face of the hatband which is visible from the inside of the crown.

3. A novelty hat comprising a crown, a brim adjoined to and extending annularly around the crown, said crown being provided with an aperture adjacent to the brim, a hatband slidably mounted externally around the crown proximate to the brim, said hatband being provided on its outwardly presented face with a series of spaced areas, each of which is provided with legible information, said hatband also being provided on its interior face with a plurality of spaced areas, each of which is imprinted with legible information, the information printed on each area of the external face of the hatband being uniquely related to the information printed in a corresponding area on the interior face of the hatband, said hatband furthermore being operatively associated with the aperture of the crown so that at any one time a particular information-containing area on the interior surface of the hatband will be visible from the inside of the crown, and means operatively associated with the crown and the exterior surface of the hatband for indicating the particular information-containing area on such exterior surface related to the corresponding information-containing area which is visible from the inside of the crown.

4. A novelty hat comprising a crown, a brim adjoined to and extending annularly around the crown, said crown being provided with an aperture adjacent to the brim, a guide-forming element attached to the crown, a hatband slidably mounted around the crown and extending through the guide-forming element, said hatband being provided on its outwardly presented face with a series of spaced areas, each of which is provided with legible information, said hatband also being provided on its interior face with a plurality of spaced areas, each of which is imprinted with legible information, the information printed on each area of the external face of the hatband being uniquely related to the information printed in a corresponding area on the interior face of the hatband, said hatband furthermore being operatively associated with the aperture of the crown so that at any one time a particular information-containing area on the interior surface of the hatband will be visible from the inside of the crown, and means operatively associated with the crown and the exterior surface of the hatband for indicating the particular information-containing area on such exterior surface, which area is related to the corresponding information-containing area visible from the inside of the crown.

5. A novelty hat comprising a crown, a brim adjoined to and extending annularly around the crown, said crown being provided with an aperture adjacent to the brim, a guide-forming element attached to the crown in the region of the aperture, a hatband slidably mounted around the crown and extending through the guide-forming element, said hatband being provided on its outwardly presented face with a series of spaced areas, each of which is provided with legible information, said hatband also being provided on its interior face with a plurality of spaced areas, each of which is imprinted with legible information, the information printed on each area of the external face of the hatband being uniquely related to the information printed in a corresponding area on the interior face of the hatband, said hatband furthermore being operatively associated with the aperture of the crown so that at any one time a particular information-containing area on the interior surface of the hatband will be visible from the inside of the crown, and means operatively associated with the crown and the exterior surface of the hatband for indicating the particular information-containing area on such exterior surface, which area is related to the corresponding information-containing area visible from the inside of the crown.

6. A novelty hat comprising a crown, a brim adjoined to and extending annularly around the crown, said crown being provided with an aperture adjacent to the brim, a guide-forming element attached to the crown in the region of the aperture and having a window in line with the aperture, a hatband slidably mounted around the crown and extending through the guide-forming element, said hatband being provided on its outwardly presented face with a series of spaced areas, each of which is provided with legible information, said hatband also being provided on its interior face with a plurality of spaced areas, each of which is imprinted with legible information, the information printed on each area of the external face of the hatband being uniquely related to the information printed in a corresponding area on the interior face of the hatband, said hatband furthermore being operatively associated with the aperture of the crown so that at any one time a particular information-containing area on the interior surface of the hatband will be visible from the inside of the crown, and means operatively associated with the crown and the exterior surface of the hatband for indicating the particular information-containing area on such exterior surface, which area is related to the corresponding information-containing area visible from the inside of the crown.

7. A novelty hat comprising a crown, a brim adjoined to and extending annularly around the crown, said crown being provided with an aperture adjacent to the brim, a hatband mounted slidably around the exterior face of the crown proximate to the brim, said hatband being provided on its outwardly presented face with a series of spaced areas, each of which is provided with legible information, said hatband also being provided on its interior face with a plurality of spaced areas, each of which is imprinted with legible information and is located in back-to-back relation with respect to a corresponding area on the exterior face of the hatband, the information printed on such corresponding areas being uniquely related, said hatband furthermore extending across the aperture of the crown so that at any one time a particular information-containing area on the interior surface of the hatband will be visible from the inside of the crown, and a window-forming element mounted on the crown in registration with the aperture for indicating the particular information-containing area on the exterior surface of the hatband which is related to the corresponding information-containing area visible from the inside of the crown.

No references cited.